United States Patent [19]

Lin

[11] Patent Number: 5,035,601
[45] Date of Patent: Jul. 30, 1991

[54] HOLLOW FORMING MACHINE CAPABLE OF ROTATING MOULD IN BOTH HORIZONTAL AND VERTICAL DIRECTION

[76] Inventor: Chao-Tung Lin, 3FL, No. 125, Lane 101, Ta Tung South Road, San Chung City, Taipei County, Taiwan

[21] Appl. No.: 482,488

[22] Filed: Feb. 21, 1990

[51] Int. Cl.⁵ .................. B28B 21/30; B29C 41/06
[52] U.S. Cl. .................. 425/429; 264/310; 264/311; 264/312; 366/200; 366/213; 366/217; 425/435; 425/453
[58] Field of Search .............. 264/310, 311, 312; 425/429, 430, 435, 425, 453, 454; 366/200, 213, 217

[56] References Cited

U.S. PATENT DOCUMENTS

| | | | |
|---|---|---|---|
| 3,838,964 | 10/1974 | Hake | 425/429 |
| 4,639,204 | 1/1987 | Munsey et al. | 425/429 |
| 4,695,244 | 9/1987 | Friesen | 425/429 |
| 4,764,322 | 8/1988 | Pitavy et al. | 264/310 |

FOREIGN PATENT DOCUMENTS 1168425 7/1985 U.S.S.R. .................. 425/429

*Primary Examiner*—Jay H. Woo
*Assistant Examiner*—Khanh P. Nguyen
*Attorney, Agent, or Firm*—Morton J. Rosenberg; David I. Klein

[57] ABSTRACT

A hollow forming machine capable of rotating moulds in both horizontal and vertical directions wherein a motor is used to drive sleeves to rotate in both vertical and horizontal directions, and through the engagement of outer gears of the sleeves and the drive gear shaft, a horizontal mandrel is driven to rotate in the same direction as the sleeves, and through the engagement of two bevel gears, the rotation of the horizontal rotation of a vertical mandrel to drive a mould seat to rotate in both horizontal and vertical directions. An air pipe is disposed in hollow pipes of the horizontal and vertical mandrels to communicate an air extractor and the mould for performing air extracting and air blowing so that the molded product has fine quality and uniform wall thickness without bubbles on the surface.

1 Claim, 3 Drawing Sheets

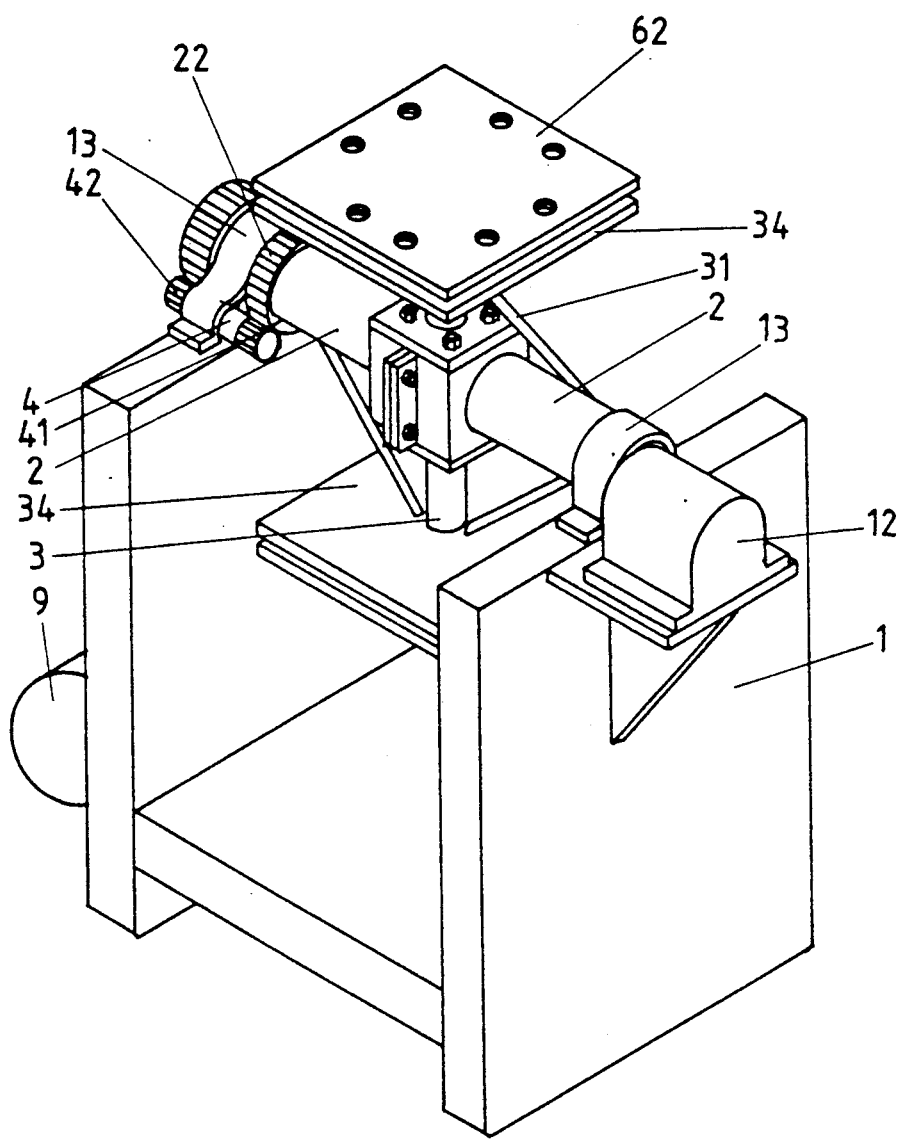
FIG—1

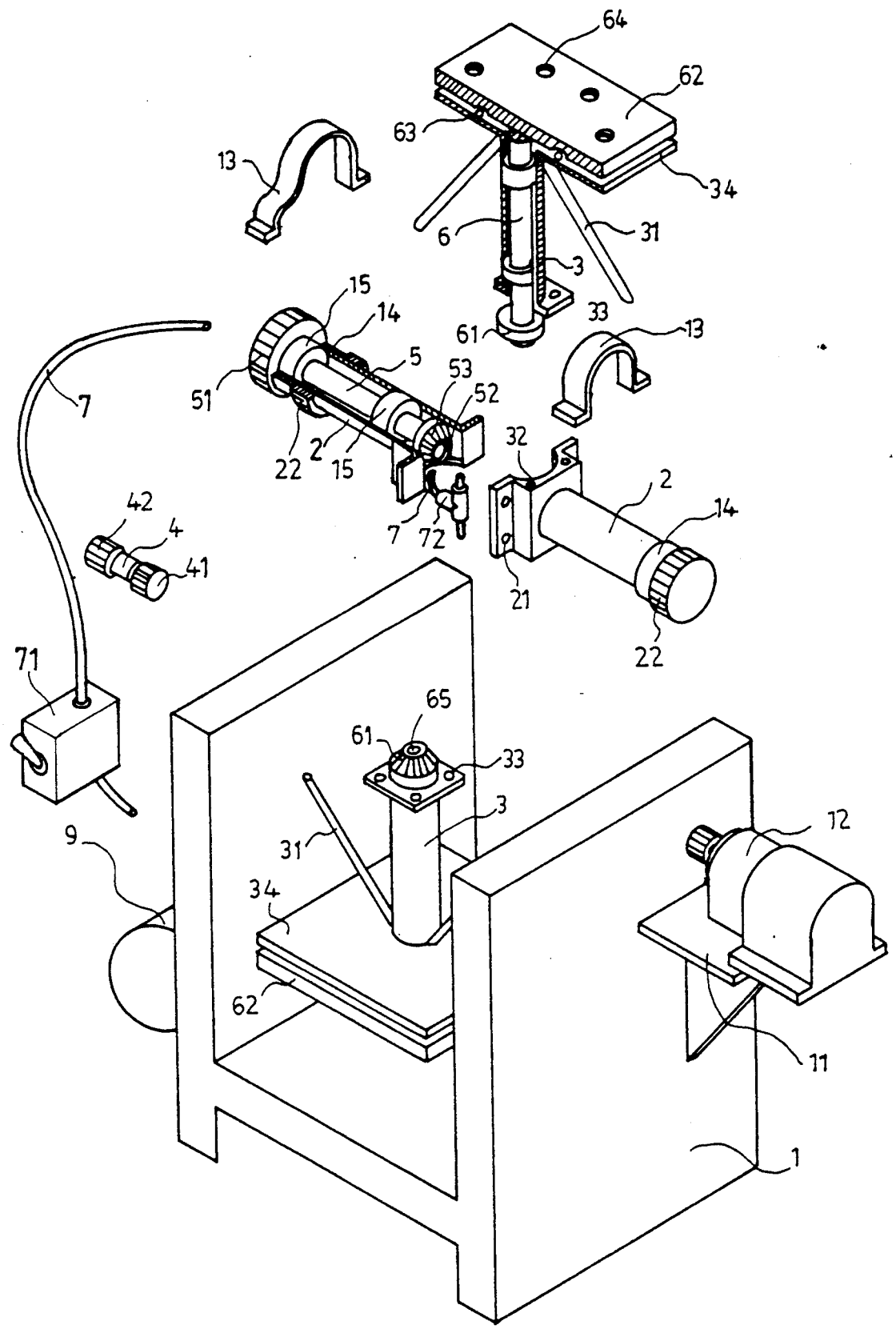
FIG—2

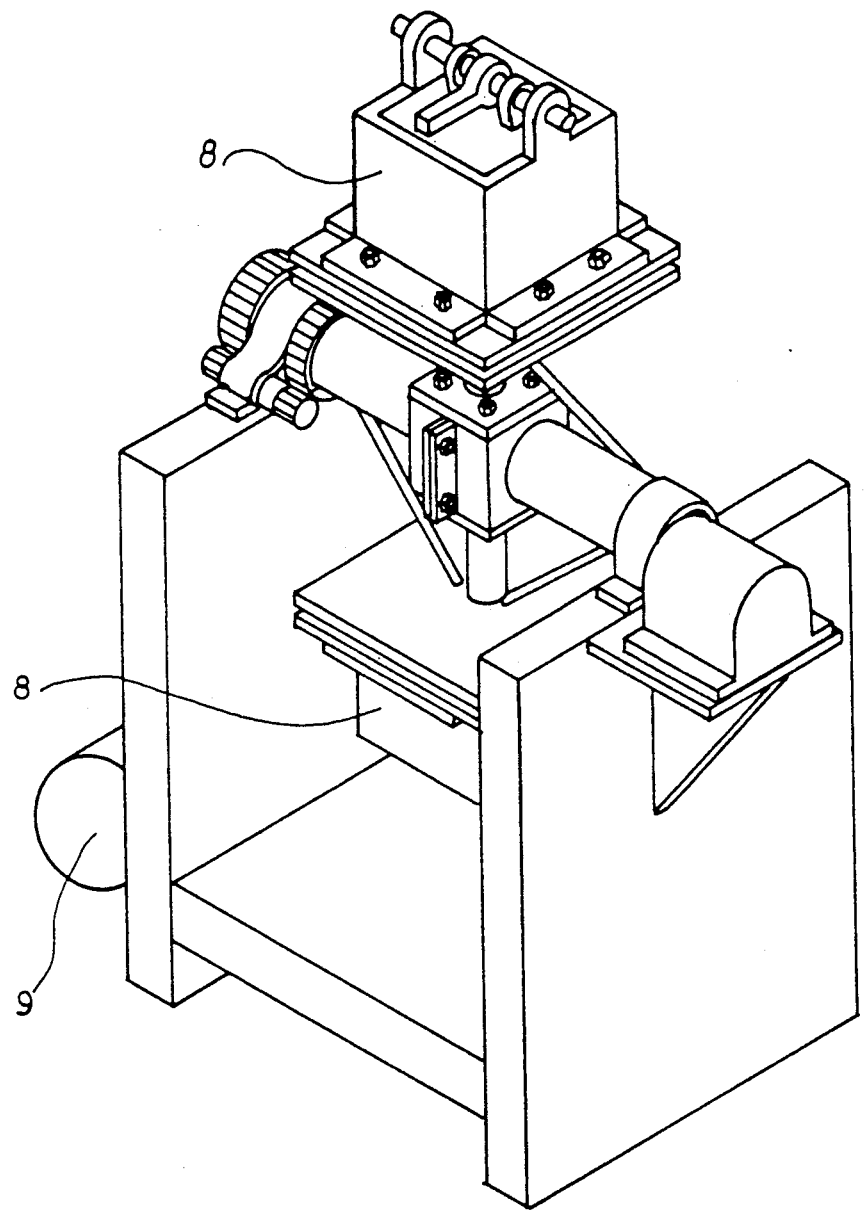
FIG—3

HOLLOW FORMING MACHINE CAPABLE OF ROTATING MOULD IN BOTH HORIZONTAL AND VERTICAL DIRECTION

BACKGROUND OF THE INVENTION

Conventional methods used for hollow forming can be divided into two categories, one of which applies air-blowing method to expand the inner space of material in the mould so that a hollow object may be formed. With this method, the forming speed is low and the thickness of product wall can not be well controlled. Another method of forming is then developed which may rotate the mould in a single direction to speed the production, however, defects such as bubbles often exist in the surface of products which reversely affects the quality of products.

Therefore, it is tried by the applicant to develop the present invention of a hollow forming machine which may rotate moulds thereon in both horizontal and vertical directions and can eliminate the above-mentioned drawbacks existing in prior art.

SUMMARY OF THE INVENTION

It is an object of the present invention to provide a hollow forming machine capable of rotating moulds in both horizontal and vertical directions. In this machine, a motor is used to drive a sleeve to rotate in vertical direction so that a mould frame may be rotated in a vertical direction, too. By the engagement of an outer gear on the sleeve, a drive gear shaft, a horizontal mandrel, and a vertical mandrel, the mould frame may be rotated in an additional direction. Further, by an air pipe provided in the hollow portions within the horizontal and the vertical mandrels as well as a control valve which may control the air extracting and blowing, a product with fine surface and even thickness without bubbles may be produced.

BRIEF DESCRIPTION OF THE DRAWINGS

A specific embodiment of the invention will now be described with reference to the accompanying drawings of which FIG. 1 is a three-dimensional perspective of the present invention;

FIG. 2 is a three-dimensional analytical perspective of the present invention; and FIG. 3 is a view showing the application of the present invention.

DETAILED DESCRIPTION OF THE PREFERRED EMBODIMENT

Please refer to FIGS. 1 and 2. The present invention includes a base part 1, a transverse sleeve 2, a longitudinal sleeve 3, a drive gear shaft 4, a horizontal mandrel 5, a vertical mandrel 6, and an air pipe 7, wherein:

The base part 1 is formed by two parallel side-boards and a horizontal support board welded therebetween, a motor seat 11 is welded to one side of the base part 1 for mounting a motor 12 thereon. Two securing members 13 are used to secure an outer bearing 14 and an inner bearing 15 on the two side-boards;

The transverse sleeve 2 is cylinder-shaped and is closely fitted into the outer bearing 14. At one end of the transverse sleeve 2, a plurality of thread holes 21 are formed so that two transverse sleeves 2 can be aligned and jointed by screws. At each end of the transverse sleeve 2, an outer gear 22 is provided for driving the motor 12 and the drive gear shaft 4 separately;

The longitudinal sleeve 3 is also cylinder-shaped and is welded to supports 31 to joint with the transverse sleeve 2. At an open end of the longitudinal sleeve 3, an expanded opening 32 is formed with thread holes 33 for screwing the longitudinal sleeve 3 to the transverse sleeve 2. On the opposite end of the longitudinal sleeve 3, a seat member 34 is welded thereto;

The drive gear shaft 4 is disposed on the other side of the base part 1 opposite to the motor 12. An inner gear 41 of the drive gear shaft 4 can engage with one of the outer gears 22 of the transverse sleeve 2, and an outer gear 42 of the drive gear shaft 4 can engage with the horizontal mandrel 5 to drive the same;

The horizontal mandrel 5 is closely fitted into the inner bearing 15 and is received in the transverse sleeve 2. A spur gear 51 at the outer end of the horizontal mandrel 5 can engage with the outer gear 42 of the drive gear shaft 4, and a first bevel gear 53 at the inner end of the horizontal mandrel 5 can engage with the vertical mandrel 6. Meanwhile, the air pipe 7 is provided within a hollow pipe 52 in the horizontal mandrel 5;

The vertical mandrel 6 is received in the longitudinal sleeve 3 with a bevel gear 61 at its lower end which may engage with the first bevel gear 52 of the horizontal mandrel 5 to drive an upper seat member 62 of the vertical mandrel 6. A plurality of balls 63 are disposed between the upper seat member 62 and the seat member 34 permitting the upper seat member 62 smoothly rotatable. A plurality of thread holes 64 are formed on the upper seat member 62 for mounting a mould seat 8. The air pipe 7 is also received in a hollow pipe 65 within the vertical mandrel 6; and One end of the air pipe 7 connects to and communicates and an air extractor 9 with a control valve 71 to control the extracting or blowing of air therethrough. With a T-union 72, the air pipe 7 is further connected to and communicates with two sets of mould seats 8 so that the air extraction and air blowing in one mould may be achieved simultaneously.

According to the above arrangement, when the motor 12 is activated, the transverse sleeve 2 is driven to rotate via the engagement of a front gear of the motor 12 with one of the outer gears 22 of the transverse sleeve 2. And, by the screwing together of the vertical and the transverse sleeves 3 and 2 as well as the welding together of the vertical sleeve 3 and the supports 31, the whole set of mould seat is capable of rotating synchronously. With the drive gear shaft 4 as a driving media between the transverse sleeve 2 and the horizontal mandrel 5, as well as the driving produced by the engagement of the two bevel gears 53, 61 of the horizontal and the vertical mandrels 5, 6, the vertical rotation of the motor 12, the transverse sleeve 2, and the horizontal mandrel 5 is converted to a horizontal rotation of the vertical mandrel 6. Moreover, with the mould seat screwed to the upper seat member 62 welded to the vertical mandrel 6, the whole set of mould seat may rotate both in horizontal and vertical directions. When the air extractor 9 communicating with the air pipe 7 is operated to extract air and blow in air, together with the horizontal and vertical rotation of the whole set of mould seat, the product in the mould shall have a much more even wall thickness than those produced by conventional method when it is formed.

Another thing shall be emphasized is that the products formed in a conventional hollow forming machine, either a blowing-air type or a single-rotation direction type, shall have an uneven wall thickness while bubbles may exist on the product surfaces. However, the present invention enables the mould seat to rotate in both horizontal and vertical directions, and applies an air pipe disposed in the horizontal and the vertical mandrels to communicate the air extractor 9 to extract out the air in the mould to form a vacuum status before the mould is filled with any material, then slowly blows in air when the forming is proceeding so that the material will expand and form a product with even wall thickness and without bubbles on the surface.

It is to be understood that the form of the invention shown and disclosed is to be taken as a preferred embodiment of the invention and that various changes in the shape, size, and arrangement of parts may be resorted to without departing from the spirit of the invention.

We claim:

1. A hollow forming machine capable of rotating moulds in both a horizontal and vertical direction comprising a base part, a transverse sleeve, a vertical sleeve, a drive gear shaft, a horizontal mandrel, a vertical mandrel, and an air pipe, wherein:

said base part includes a pair of parallel side-boards having a horizontal support board welded therebetween, a motor seat is welded to said base part for mounting a motor thereon, two securing members are used to secure an outer bearing and an inner bearing on said sideboards;

said transverse sleeve is cylinder-shaped and fitted into said outer bearing, one end of said transverse sleeve includes a plurality of thread holes so that a pair of transverse sleeves are aligned and connected by screws; at the other end of said transverse sleeve an outer gear is provided for individually driving said motor and said drive gear shaft;

said vertical sleeve is also cylinder-shaped and is welded to supports to join with said transverse sleeve; at an open end of said vertical sleeve an expanded opening is formed with thread holes for threadedly securing said vertical sleeve on said transverse sleeve; on an end opposite said open end of said vertical sleeve a seat member is welded to said vertical sleeve;

said drive gear shaft is disposed on a side of said base part opposite to said motor, an inner gear of said drive gear shaft engages one of said outer gears of said transverse sleeve, and an outer gear of said drive gear shaft engages said horizontal mandrel to drive said horizontal mandrel;

said horizontal mandrel is closely fitted into said inner bearing and is received in said transverse sleeve; a spur gear mounted on an outer end of said horizontal mandrel engages said outer gear of said drive gear shaft, and a first bevel gear mounted on an inner end of said horizontal mandrel engages said vertical mandrel; said air pipe being provided within a hollow pipe in said horizontal mandrel;

said vertical mandrel is received in said vertical sleeve with a bevel gear mounted on a lower end thereof which engages said first bevel gear of said horizontal mandrel to drive an upper seat member of said vertical mandrel; a plurality of balls are positioned between said upper seat member and said seat member for rotational displacement of said upper seat member; a plurality of threaded holes are formed within said upper seat member for mounting a mould seat; said air pipe being received in a hollow pipe within said vertical mandrel; and one end of said air pipe being connected to and in fluid communication with an air extractor having a control valve to control the extraction and insert of air therethrough; said air pipe is further connected to and in fluid communication with two sets of mould seats for extraction and air insert simultaneously provided in one mould, whereby when said motor is activated, said transverse sleeve is driven to rotate via engagement of a front gear of said motor with said outer gear of said transverse sleeve; and, by threadedly engaging said vertical and said transverse sleeves and welding said vertical sleeve and said supports, said mould seats being synchronously rotatable, said drive gear shaft being a driving media between said transverse sleeve and said horizontal mandrel including driven engagement of said two bevel gears of said horizontal and said vertical mandrels, whereby a vertical rotation of said motor is translated into a horizontal rotation of said vertical mandrel and said mould seat threaded to said upper seat member welded to said vertical mandrel provides for said mould seat to be rotated both in a horizontal and vertical direction.

* * * * *